US010162995B2

(12) United States Patent
Lin et al.

(10) Patent No.: US 10,162,995 B2
(45) Date of Patent: Dec. 25, 2018

(54) CAPACITIVE IMAGE SENSOR WITH NOISE REDUCTION FEATURE AND METHOD OPERATING THE SAME

(71) Applicant: SunASIC Technologies, Inc., New Taipei (TW)

(72) Inventors: Chi Chou Lin, Taipei (TW); Zheng Ping He, Taipei (TW)

(73) Assignee: SUNASIC TECHNOLOGIES, INC., New Taipei (TW)

( * ) Notice: Subject to any disclaimer, the term of this patent is extended or adjusted under 35 U.S.C. 154(b) by 16 days.

(21) Appl. No.: 15/488,536

(22) Filed: Apr. 17, 2017

(65) Prior Publication Data
US 2018/0300520 A1    Oct. 18, 2018

(51) Int. Cl.
G06K 9/00    (2006.01)
(52) U.S. Cl.
CPC ................................. G06K 9/0002 (2013.01)
(58) Field of Classification Search
CPC ..................................................... G06F 3/044
See application file for complete search history.

(56) References Cited

U.S. PATENT DOCUMENTS

| 3,497,824 A * | 2/1970 | Goordman | H03F 3/45085 330/258 |
| 2017/0091509 A1* | 3/2017 | Riedijk | G06K 9/22 |
| 2017/0103246 A1* | 4/2017 | Pi | G06K 9/0002 |
| 2018/0144170 A1* | 5/2018 | Suwald | G06K 9/0002 |

* cited by examiner

Primary Examiner — David F Dunphy
(74) Attorney, Agent, or Firm — Jackson IPG PLLC; Demian K. Jackson

(57) ABSTRACT

A capacitive image sensor with noise reduction feature and a method operating the capacitive image sensor are provided. The capacitive image sensor includes: a number of capacitive sensing units forming an array, each capacitive sensing unit for transforming a distance between a portion of a surface of an approaching finger and a top surface thereof into an output electric potential, wherein a value of the output electric potential is changed by a driving signal coupled on the finger; at least one sample-and-hold circuit for capturing and retaining different output electric potentials; at least one signal conditioning circuit, each comprising: at least one differential amplifier for amplifying a difference between two electric potentials retained by the sample-and-hold circuit; and a driving source, for providing the driving signal to the finger.

10 Claims, 8 Drawing Sheets

CAPACITIVE IMAGE SENSOR WITH NOISE REDUCTION FEATURE AND METHOD OPERATING THE SAME

FIELD OF THE INVENTION

The present invention relates to a capacitive image sensor and a method to operate the capacitive image sensor. More particularly, the present invention relates to a capacitive image sensor with noise reduction feature and a method to operate the capacitive image sensor.

BACKGROUND OF THE INVENTION

There are many human physiological characteristics which can be used to provide personnel identification for security purposes, such as fingerprint, retina, iris, DNA, or even face features. For all the devices that are capable of distinguishing some physiological characteristics of one person from others', a fingerprint reader has the lowest cost and complexity, while the identification results are generally pretty good. In addition, the size of data required to store the minutiae of one fingerprint is small (ranging from 120 bytes to 2K bytes). This makes fingerprint identification devices widely accepted in many applications.

There are also many types of sensing techniques for capturing fingerprints. The popular ones are the optical type and capacitive type. Optical fingerprint sensing modules utilize reflected light intensity from the surface of a finger to tell where the ridges and valleys are on the contact portion of the finger. The advantage of the optical technique is reliability and low cost. However, due to the size of the embedded optical lens, the form factor of an optical fingerprint sensing module cannot be kept small. It is difficult for the optical type sensor to be embedded in portable devices. The capacitive-type fingerprint identification modules, on the other hand, are made out of silicon chips and can be made very compact. In some cases, when a fingerprint image can be fetched by slide scanning, the fingerprint sensor can be even thin and slim, too. The small form factor of capacitive-type fingerprint identification module makes it suitable for portable applications such as access control badges, bank cards, cellular phones, tablet computers, USB dongles, etc.

Capacitive-type fingerprint sensors are based on the principle that the capacitance of two parallel conductive plates is inversely proportional to the distance between them. A capacitive fingerprint sensor consists of an array of sensing units. Each sensing unit contains a sensing plate. By using the sensing plate as one plate of the two-plated capacitor and a dermal tissue as another plate, ridges and valleys of a fingerprint can be located by measuring the different capacitances. There are many prior arts related to the capacitive-type fingerprint identification module. Most of them have been applied to manufacture fingerprint sensors. However, there are also many problems pending for solutions. One of them is the accuracy of the sensing elements.

Due to the high-density nature, the popular capacitive fingerprint sensors are mainly manufactured with semiconductor processes. The precision of the sensing elements is affected by many factors inherited in the manufacturing technology, such as density of chemical impurities, alignment of photomasks, equipment control, etc., whose uncertainty or variation will be reflected in the different behavior between devices, or even a fixed pattern noise seen in the captured fingerprint images of the same device. In order to achieve the best performance of personal identification, it is desirable to improve the quality of the captured fingerprint image by reducing the noise pattern. A common practice to eliminate fixed pattern noise is to calibrate the device before use. The calibration data can be calculated and stored as part of the manufacturing process, or right before the device is used. However, in either case, a certain amount of memory storage space must be set aside for the calibration data, and this storage space will increase the system cost. Therefore, an innovative pixel sensing element, a capacitive fingerprint sensor made by the pixel sensing elements and a method for running the pixel sensing element are desirable.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the issues mentioned above, a capacitive image sensor is provided. The capacitive image sensor includes: a number of capacitive sensing units forming an array, each capacitive sensing unit for transforming a distance between a portion of a surface of an approaching finger and a top surface thereof into an output electric potential, wherein a value of the output electric potential is changed by a driving signal coupled on the finger; at least one sample-and-hold circuit for capturing and retaining different output electric potentials; at least one signal conditioning circuit, each comprising: at least one differential amplifier for amplifying a difference between two electric potentials retained by the sample-and-hold circuit; and a driving source, for providing the driving signal to the finger.

The driving signal is a signal with a potential change or potential changes, caused by a positive waveform or a negative waveform. The electric potential at each part of the capacitive sensing units is set to a constant value during reset stages. The difference between two output electric potentials retained in the sample-and-hold circuit is a noise-reduced value representing a distance between the capacitive sensing unit and the portion surface of the finger above the capacitive sensing unit. The sample-and-hold circuit retains at least a first and a second output electric potentials under a corresponding positive waveform or negative waveform. The capacitive image sensor sequentially collects the noise-reduced values under the corresponding positive waveform and negative waveform for each pixel, and maps the noise-reduced values to corresponding locations of the capacitive sensing units to obtain a noise-reduced image of the finger.

Preferably, shapes of the positive waveform and the negative waveform may be symmetrical. The positive waveform or the negative waveform may be a step function. The at least one signal conditioning circuit may further include an analog-to-digital converter for converting the output electric potentials from the differential amplifier into a digitized value.

According to the present invention, the capacitive sensing unit may further include: a sensing electrode; a voltage follower, wherein an input node of the voltage follower is connected to the sensing electrode, and an output node of the voltage follower is connected to the sample-and-hold circuit; a first comparative capacitor, wherein one node of the first comparative capacitor is electrically connected to the voltage follower, and the other node thereof is electrically connected to a ground end; a bias voltage source, for providing a constant bias voltage; and a first switch, connected between the constant voltage source and the first comparative capacitor. The first comparative capacitor and all components electrically connected thereto are reset to the constant bias voltage while the first switch is turned on.

The first comparative capacitor may comprise a reference capacitor and parasitic capacitance.

Preferably, the first comparative capacitor may include a reference capacitor and parasitic capacitance. The reference capacitor may be a MOSFET (Metal-Oxide-Semiconductor Field-Effect Transistor) capacitor, a PIP (Polysilicon-Insulator-Polysilicon) capacitor or a MIM (Metal-Insulator-Metal) capacitor.

The capacitive sensing unit may further include: a second comparative capacitor, connected between the sensing electrode and the ground; a share switch, connected between the first and second comparative capacitors; and a second switch, connected between the sensing electrode and ground. The sensing electrode is reset to ground potential when the second switch is turned on. Each sample-and-hold circuit may further include: a first and a second charge holding capacitors, for holding the output electric potentials sent by the voltage follower; and at least one selecting switch, for switching between the charge holding capacitors.

The present invention also provides a method for operating the capacitive image sensor to fetch an image of the finger. The method includes the steps of: resetting the capacitive sensing units to be capable of sensing; exerting the driving signal having a first waveform to the capacitive sensing units via the finger; retaining a first output electrical potential; resetting the capacitive sensing units to be capable of sensing; exerting the driving signal having a second waveform to the capacitive sensing units via the finger; retaining a second output electrical potential; giving an output electric potential proportional to the difference between the first and second output electric potential; sequentially collecting the noise-reduced values obtained under corresponding positive waveform and negative waveform for each pixel; converting the noise-reduced values into digitized noise-reduced values; and mapping the digitized noise-reduced values to corresponding locations of capacitive sensing units. If the first waveform is a positive waveform, then the second waveform is a negative waveform; if the first waveform is a negative waveform, then the second waveform is a positive waveform.

DETAILED DESCRIPTION OF THE PREFERRED EMBODIMENTS

The present invention will now be described more specifically with reference to the following embodiments.

Figure 1:
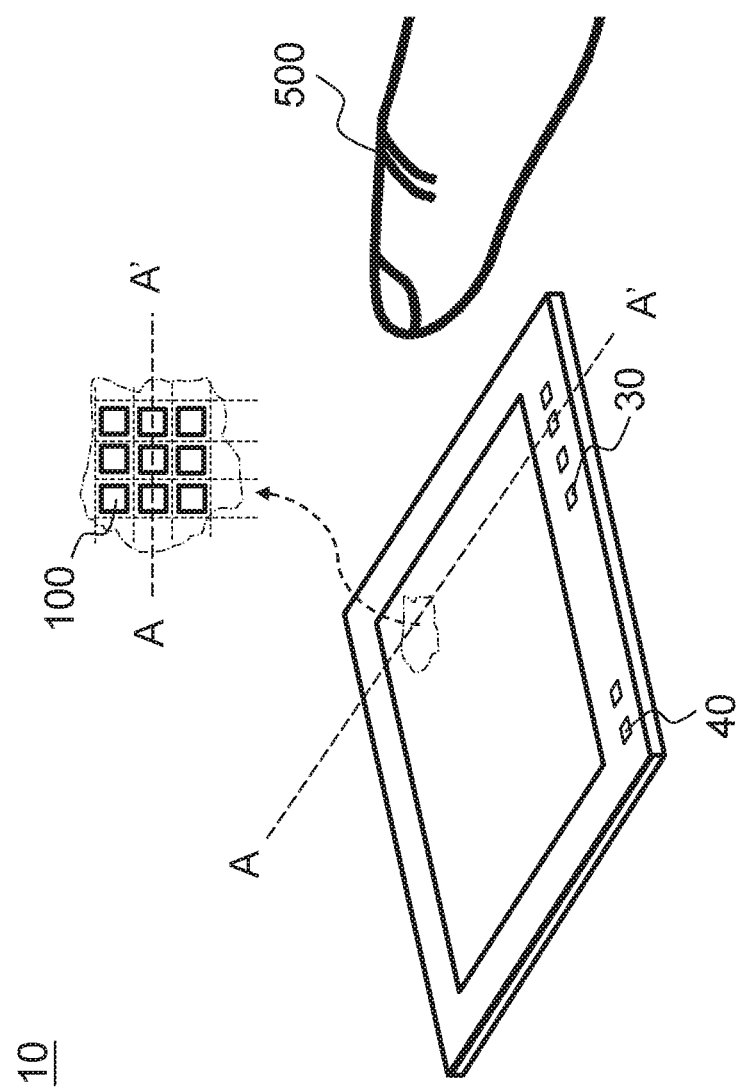
FIG. 1 is a schematic diagram of a capacitive image sensor according to the present invention.

Please see FIG. 1. FIG. 1 shows a schematic diagram of a capacitive image sensor 10 (chip) according to the present invention. The capacitive image sensor 10 is used to depict ridges and valleys of a surface of a finger 500, further converting the results into a noise-reduced image of the fingerprint. The capacitive image sensor 10 includes an array of capacitive sensing units 100, contact pads 40 of a power supply, and contact pads 30 of an input/output (I/O) interface. The output from each capacitive sensing unit 100 represents one corresponding pixel of the fingerprint image.

Figure 2:
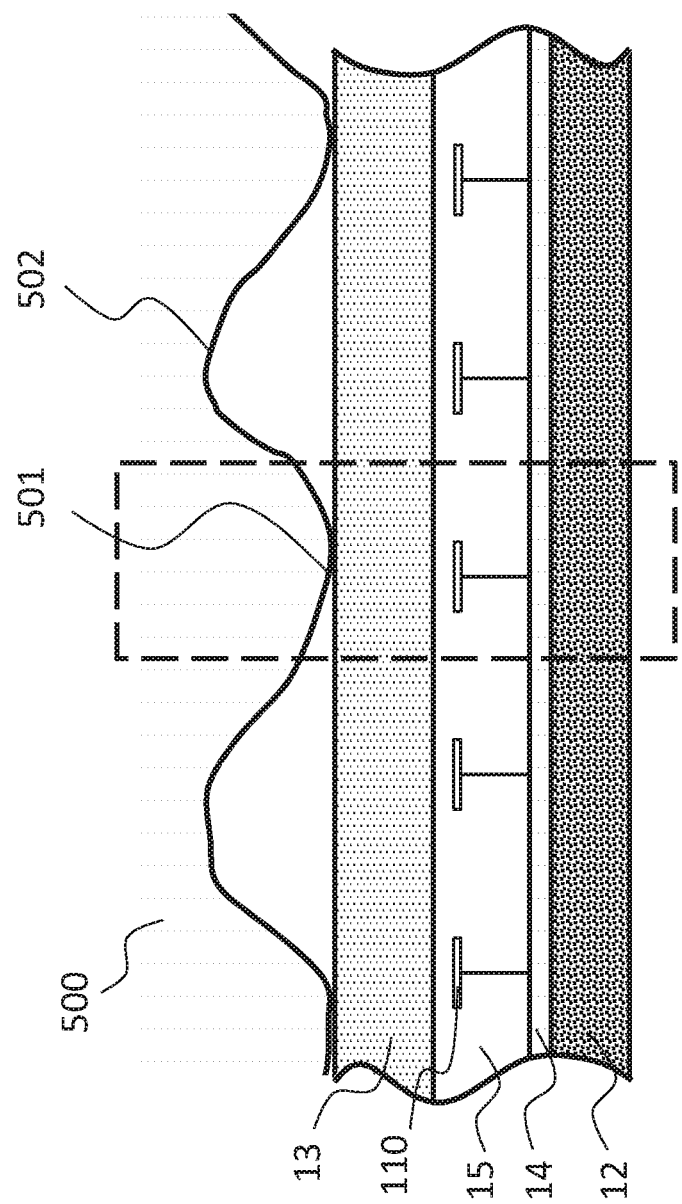
FIG. 2 is a schematic cross-section of a portion of the capacitive image sensor taken along line A-A' in FIG. 1.

FIG. 2 is a schematic cross-section of a portion of the capacitive image sensor 10 taken along line A-A' in FIG. 1, with a protective layer 13 located on top capacitive image sensor 10 and a fingertip 500 placed on the protective layer 13. The protective layer 13 may be made of glass, sapphire, epoxy compound, or coating material. The capacitive image sensor 10 comprises a semiconductor substrate 12, having the array of capacitive sensing units 100 formed thereon. The surface of the fingertip 500 comprises ridges 501 that are in contact with the protective layer 13 and valleys 502 that are spaced apart from the protective layer 13. Each capacitive sensing unit 100 can be used to transform a distance between a portion of a surface of the approaching finger 500 and a top surface of itself into an output electric potential. Five capacitive sensing units 100 are shown in FIG. 2, and one of the capacitive sensing units 100 is enclosed by a dashed frame. Each capacitive sensing unit 100 comprises a sensing electrode 110 in the form of a conductive plate. Below the conductive plate are active semiconductor circuitries 14 schematically shown by a forward-diagonal-lines region in FIG. 2. At least one insulating layer 15 is formed to enclose the sensing electrodes 110. Details of the active semiconductor circuitry 14 will be described in later paragraphs.

Figure 3:
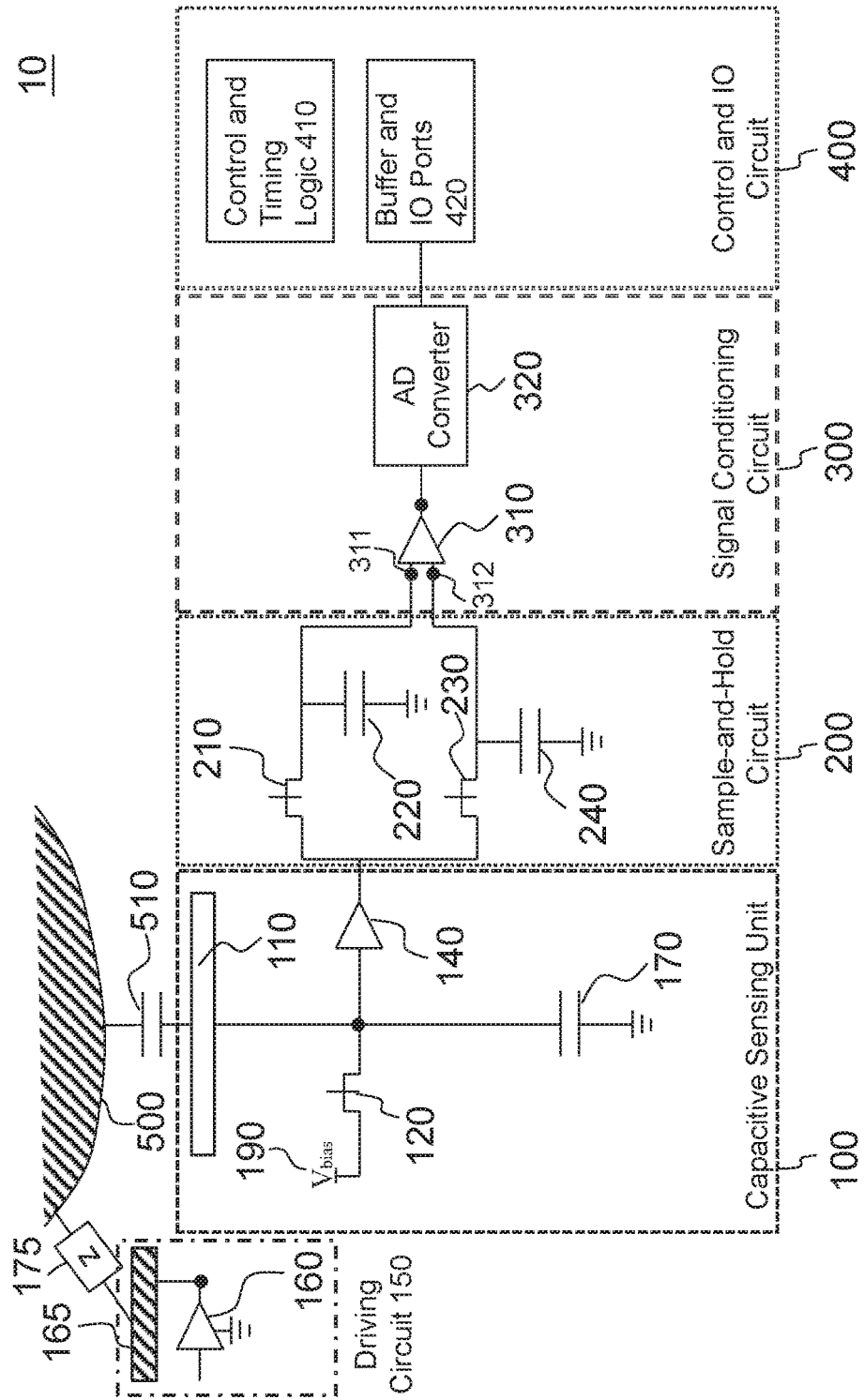
FIG. 3 is an equivalent circuit of the capacitive image sensor (one pixel) of a first embodiment according to the present invention.

Please refer to FIG. 3. FIG. 3 is an equivalent circuit of the capacitive image sensor 10 (one pixel) according to the present invention. The capacitive image sensor 10 comprises an array of capacitive sensing units 100 (enclosed by dashed line), a driving circuit 150, a plurality of sample-and-hold circuit 200 (enclosed by dotted line), a plurality of signal conditioning circuit 300 (enclosed by double-dashed line), and a control and IO circuit 400 (enclosed by double-dotted line). For illustration purpose, FIG. 3 only shows one capacitive sensing unit 100, one sample-and-hold circuit 200 and one signal conditioning circuit 300. The sample-and-hold circuit 200, the signal conditioning circuit 300, the control and IO circuit 400, a portion of the capacitive sensing unit 100, and a portion of the driving circuit 150 are formed inside the active semiconductor circuitry 14. Each circuit will be described in details below.

The capacitive sensing unit 100 comprises a sensing electrode 110, a first switch 120, a voltage follower 140, a first comparative capacitor 170, and a bias voltage source 190. A parasitic capacitance (not shown) representing the sum of parasitic capacitance between the sensing electrode 110 and other parts of the sensing structure that are not connected to it (not shown) can be treated as a part of the first comparative capacitor 170. A reference capacitor (not shown), having a capacitance $C_r$, is formed between ground and the sensing electrode 110, and the reference capacitor is used to store the electric charges during the operation. The reference capacitor is a MOSFET (Metal-Oxide-Semiconductor Field-Effect Transistor) capacitor, a PIP (Polysilicon-Insulator-Polysilicon) capacitor or a MIM (Metal-Insulator-Metal) capacitor. The first comparative capacitor 170 is an equivalent capacitor, denoted as $C_c$, representing the total effect of the parasitic capacitance and the reference capacitor, i.e. $C_c=C_r+C_p$. Therefore, one node of the first comparative capacitor 170 is electrically connected to the voltage follower 140, and the other node is electrically connected to the ground end. In some manufacturing process, when the value of the parasitic capacitance is well controlled, the reference capacitor may not be necessary, i.e. $C_c=C_p$. The driving circuit 150 comprises a driving source 160 and a driving electrode 165. The driving source 160 is controlled by a control and timing logic 410 and provides a positive or negative waveform (a voltage raise or drop signal) to the driving electrode 165 at different times. The first switch 120, the voltage follower 140, the first comparative capacitor 170, and the driving source 160 are formed inside the active semiconductor circuitry 14. The driving electrode 165 may be an external component electrically connected to the driving source 160 via one of the I/O contact pads 30, such as a conductive strip or a conductive metal ring. The driving electrode 165 may not be a part of the chip but a component of a capacitive image sensor module which may comprise a PCB substrate, a number of passive electric components, a capacitive image sensor 10, and seal materials. When a finger 500 approaches the capacitive image sensor 10, a finger capacitance 510, denoted as $C_f$, is formed between the finger 500 and the sensing electrode 110. Meanwhile, a driving impedance 175 is also formed between the finger 500 and the driving electrode 165. The sensing electrode 110 is a metal plate at the top side of the capacitive sensing unit 100, used to form one side of a parallel plate capacitor. Here, the parallel plate capacitor is an equivalent capacitor representing the finger capacitance 510. The other side of the parallel plate capacitor is the surface of the finger 500, which is part of the human body. The driving electrode 165 carries the driving signals and couples that signal into the finger 500. In order to maximize the effect of the driving signal (lower the value of the driving impedance 175), a large total contact area of the driving electrode 165 is needed. For example, a metal ring or several metal strips surrounding the array of the capacitive sensing units 100, or an array of electrodes interleavedly formed between the capacitive sensing units 100 are reasonable forms of the driving electrode 165, as long as the total area thereof is large enough to reduce the value of the driving impedance 175. The first switch 120 is a MOS device used as a switch to connect or disconnect the bias voltage source 190, denoted as $V_{bias}$, to the sensing electrode 110 and the first comparative capacitor 170. The bias voltage source 190 is used to provide a constant bias voltage. The bias voltage is a 1.5V constant voltage reference in the present embodiment. The voltage follower 140 is a circuit device that has input and output signals. The output signal tracks the input signal. Usually, a voltage follower is implemented as a unity gain amplifier. The input node of the voltage follower 140 is connected to the sensing electrode 110, and the output node is connected to the sample-and-hold circuit 200.

The sample-and-hold circuit 200 in FIG. 3 is a device used to capture and retain output electric potentials from the capacitive sensing unit 100. The sample-and-hold circuit 200 comprises a first sample switch 210, a first charge holding capacitor 220, a second sample switch 230, and a second charge holding capacitor 240. The first sample switch 210 is formed between the output node of the voltage follower 140 and the first charge holding capacitor 220, and is a MOS device used as a switch to connect the output of the voltage follower 140 to the first charge holding capacitor 220. The first charge holding capacitor 220 is a capacitor used to capture and retain a first output electric potential, denoted as $V_1$, from the voltage follower 140 through the first sample switch 210. One node of the first charge holding capacitor 220 is connected to the first sample switch 210 and the other node is connected to the ground. The second sample switch 230 is formed between the output node of the voltage follower 140 and the second charge holding capacitor 240, and is a MOS device used as a switch to connect the output of the voltage follower 140 to the second charge holding capacitor 240. The second charge holding capacitor 240 is a capacitor used to capture and retain a second output electric potential, denoted as $V_2$, from the voltage follower 140 through the second sample switch 230. One node of the second charge holding capacitor 240 is connected to the second sample switch 230 and the other node is connected to the ground. The first sample switch 210 and the second sample switch 230 works together as a selecting switch for the output target of the voltage follower 140 switches between the charge holding capacitors.

The signal conditioning circuit 300 is a circuit to amplify a voltage difference between the first and second output electric potentials, possibly with level shift, and then convert the result to a digitized value. The signal conditioning circuit 300 comprises a differential amplifier 310 and an analog-to-digital converter (AD converter) 320. A first input node 311 of the differential amplifier 310 is connected to the first charge holding capacitor 220 and the first sample switch 210, a second input node 312 of the differential amplifier 310 is connected to the second charge holding capacitor 240 and the second sample switch 230, and an output node of the differential amplifier 310 is connected to an input node of the analog-to-digital converter 320. The differential amplifier 310 is an amplifier used to produce a voltage output that is proportional to the difference between the first and second output electric potentials. The analog-to-digital converter 320 converts the output electric potential of the differential amplifier 310 and produces a binary value that represents the voltage level.

The Control and IO circuit 400 is a circuit that handles the timing sequence and data input/output of the capacitive image sensor 10. The Control and IO circuit 400 comprises a Control and Timing logic 410 and Buffer and IO ports 420. The Control and Timing logic 410 controls all switches in the capacitive image sensor 10. The Buffer and IO ports 420 receives the output data of the analog-to-digital converter 320 and store the data into a buffer and then send out the data at a proper time.

Figure 4:
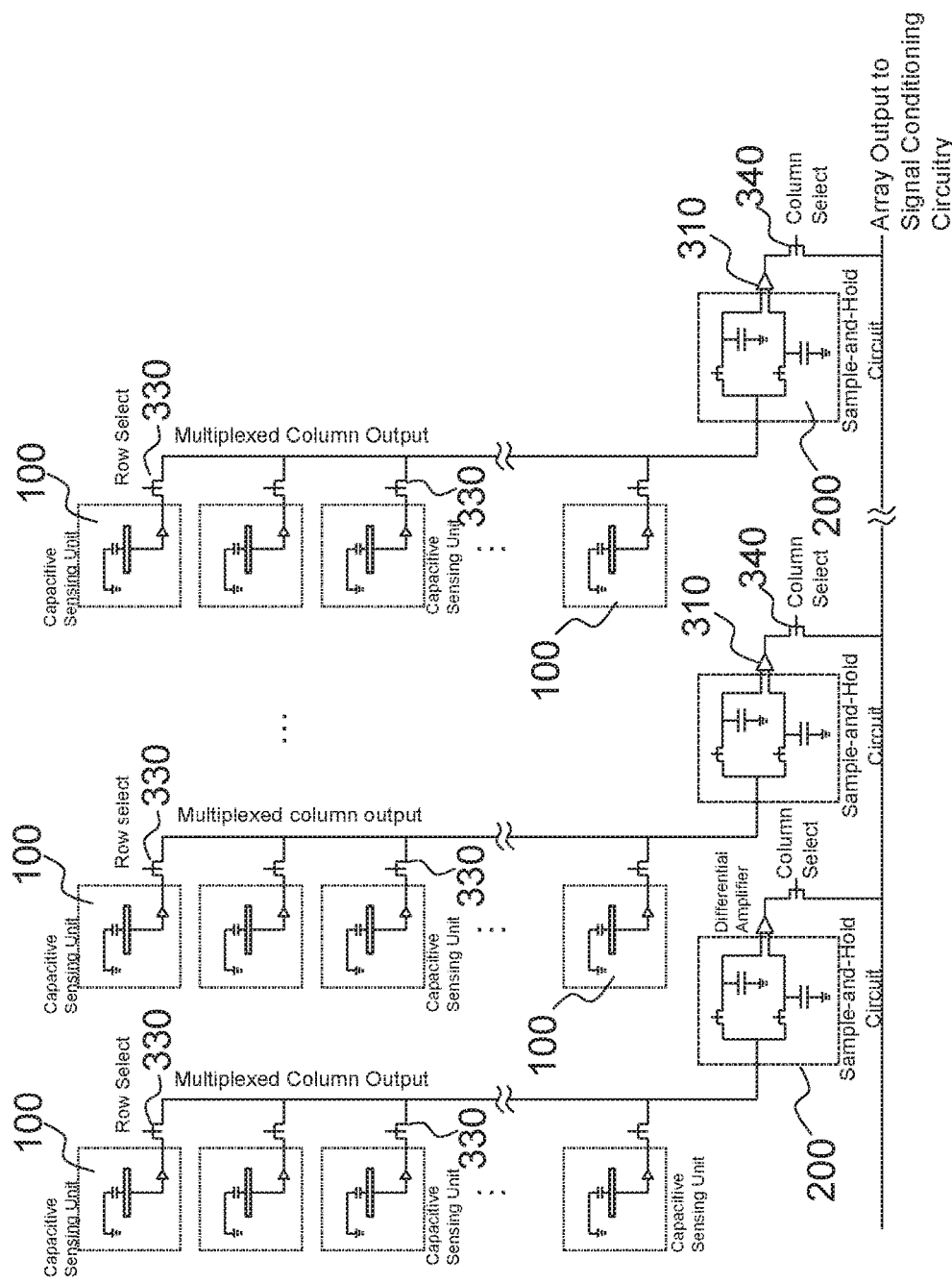
FIG. 4 is a schematic diagram of a typical implementation of the capacitive image sensor according to the present invention.

Please refer to FIG. 4. FIG. 4 is a schematic diagram of a typical implementation of the capacitive image sensor 10 according to the present invention. The capacitive image sensor 10 comprises a two-dimensional array of capacitive sensing units 100 and a number of sample-and-hold circuits 200. Other circuits are not shown in this diagram. The two-dimensional array of the capacitive sensing units 100 is enabled in a row-by-row sequence. The capacitive sensing units 100 in the same column share the same output wire through separate row select signals. One row is enabled by the corresponding row select signal at a time. The row select switches 330 are controlled by the row select signals sent out by the control and timing logic 410. Each column output wire connects to a shared sample-and-hold circuit 200 and a differential amplifier 310. The output of the differential amplifiers 310 is multiplexed to a single output signal through a set of column select signals. The column select switches 340 are controlled by column select signals sent out by the control and timing logic 410. Only one of the column select signals is activated at a time, to allow the output of the differential amplifiers 310 to be sequentially delivered to the analog-to-digital converter 320 in the signal conditioning circuit 300.

Figure 5:
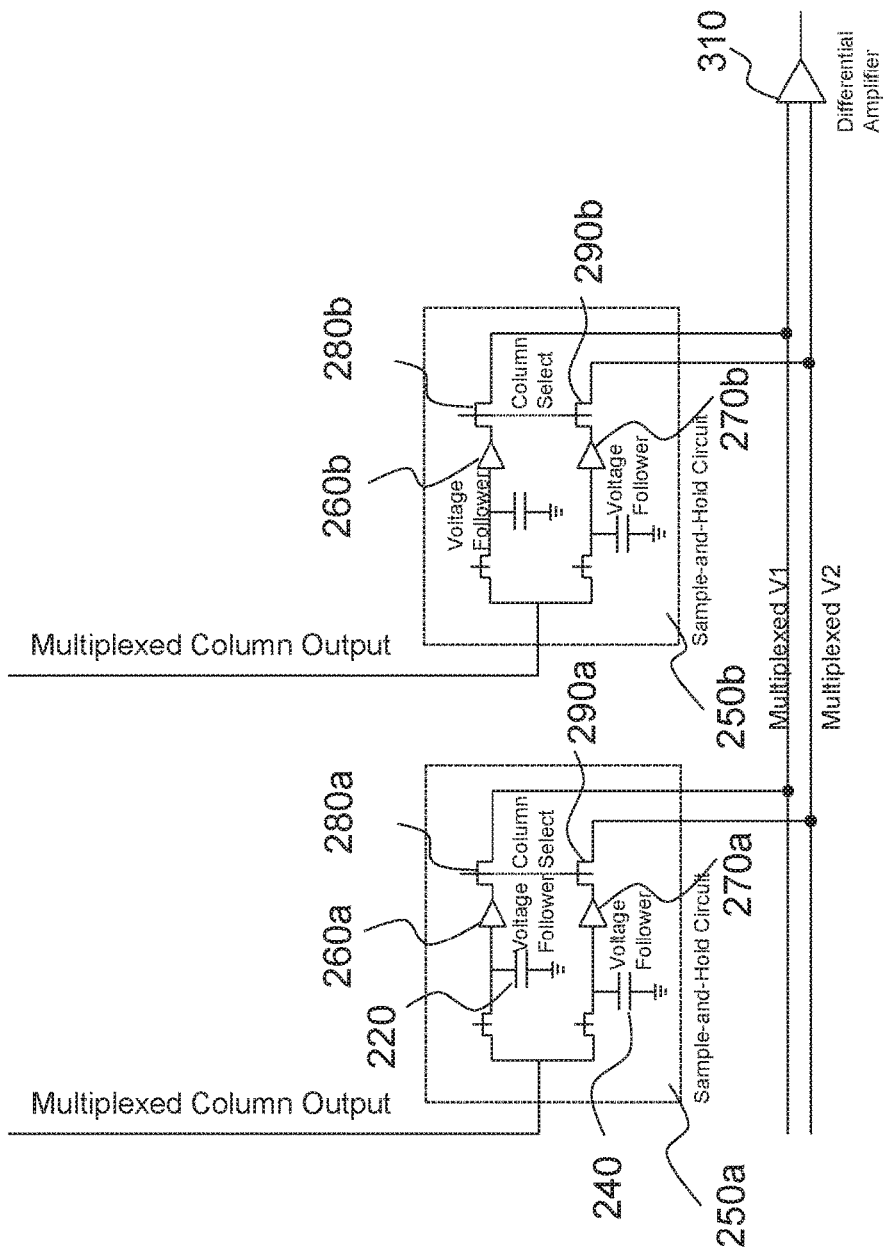
FIG. 5 shows an alternative structure of a sample-and-hold circuit and that of the connection between a differential amplifier and the sample-and-hold circuit.

Please refer to FIG. 5. FIG. 5 shows an alternative structure of a sample-and-hold circuit 250a/250b and that of the connection between the differential amplifier 310 and the sample-and-hold circuit 250. The sample-and-hold circuits 250a/250b may share the same differential amplifier 310 through additional voltage followers (e.g. 260a and 270a), and column select switches (e.g. 280a and 290a) between the charge holding capacitors (220 and 240) and the differential amplifier 310. For example, a voltage follower 260a and a column select switch 280a are formed between the first charge holding capacitor 220 and the differential amplifier 310, and a voltage follower 270a and a column select switch 290a are formed between the second charge holding capacitor 240 and the differential amplifier 310.

Figure 6:
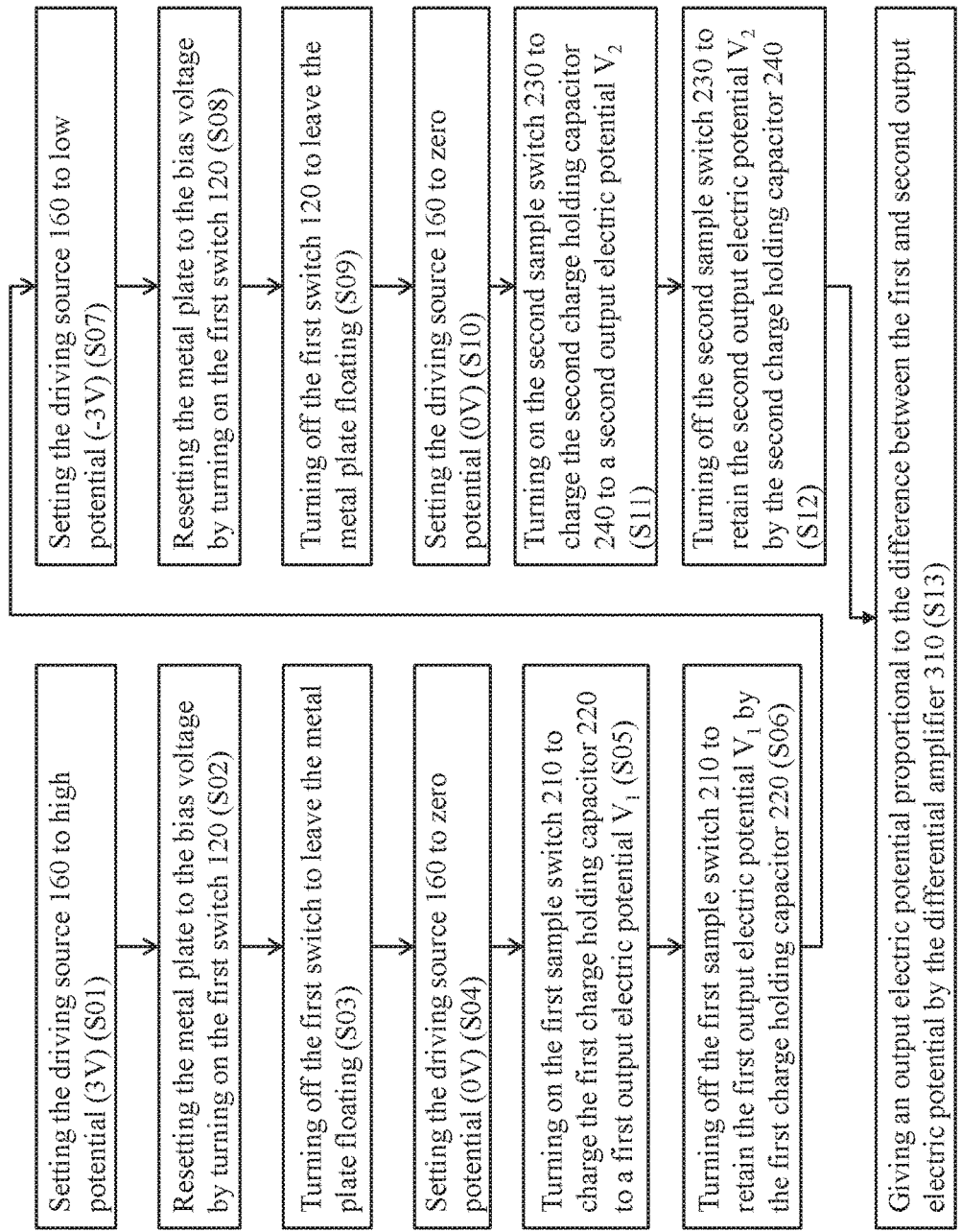
FIG. 6 is a flowchart illustrating a procedure to operate a capacitive sensing unit in the capacitive image sensor of the first embodiment.

A method for operating the capacitive image sensor 10 is also disclosed. Please refer to FIG. 6. It is a flowchart illustrating a procedure to operate a capacitive sensing unit 100 in the capacitive image sensor 10. The steps are:
- (S01) setting the driving source 160 to high potential (3V);
- (S02) resetting the metal plate (sensing electrode 110) to the bias voltage by turning on the first switch 120;
- (S03) turning off the first switch 120 to leave the metal plate floating;
- (S04) setting the driving source 160 to zero potential (0V);
- (S05) turning on the first sample switch 210 to charge the first charge holding capacitor 220 to a first output electric potential $V_1$;
- (S06) turning off the first sample switch 210 to retain the first output electric potential $V_1$ by the first charge holding capacitor 220;
- (S07) setting the driving source 160 to low potential (−3V);
- (S08) resetting the metal plate 110 to the bias voltage by turning on the first switch 120;
- (S09) turning off the first switch 120 to leave the metal plate floating;
- (S10) setting the driving source 160 to zero potential (0V);
- (S11) turning on the second sample switch 230 to charge the second charge holding capacitor 240 to a second output electric potential $V_2$.
- (S12) turning off the second sample switch 230 to retain the second output electric potential $V_2$ by the second charge holding capacitor 240; and
- (S13) giving an output electric potential proportional to the difference between the first and second output electric potential by the differential amplifier 310.

Here, Steps 1 to 3 (S01-S03) are the first reset stage, Steps 4 to 6 (S04-S06) are the first sensing stage, Steps 7 to 9 (S07-S09) are the second reset stage, Steps 10 to 12 (S10-S12) are the second sensing stage, and Step 13 is the final stage. The output electric potential proportional to the difference between the first and second output electric potential in step 13 is a noise-reduced value of that pixel (capacitive sensing unit). The noise-reduced value represents a distance between the capacitive sensing unit and the portion surface of the finger above the capacitive sensing unit. The sequence of steps S01-S6 and steps S07-S12 can be switched. Namely, a positive waveform and a negative waveform are applied by the driving source to get the noise-reduced value no matter what the sequence is. For a better understanding, take the waveform formed from step 1 to step S04 as a first waveform and the waveform formed from step S07 to step S10 as a second waveform. If the first waveform is a positive waveform, then the second waveform is a negative waveform; if the first waveform is a negative waveform, then the second waveform is a positive waveform. There may be additional steps to convert the output electric potentials into a digitized image. The steps are:
- (S14) sequentially collecting the noise-reduced values obtained under corresponding positive waveform and negative waveform for each pixel;
- (S15) converting the noise-reduced values into digitized noise-reduced values; and
- (S16) mapping the digitized noise-reduced values to corresponding locations of capacitive sensing units For a better understanding, a result analysis is illustrated below. After Step S04, the potential of the metal plate should be $$V_{m1} = V_{bias} + \Delta V_{d1} \cdot \left( \frac{C_f}{C_f + C_r + C_p} \right) = 1.5 - 3 \cdot \left( \frac{C_r}{C_f + C_r + C_p} \right).$$

Here, $V_{bias}$ is the potential of the bias voltage source (1.5V), $\Delta V_{d1}$ is the potential change caused by a negative waveform (a voltage drop signal) sent by the driving source 160, $C_f$ is a value of the finger capacitance 510, and $(C_r+C_p)$ is a value of the comparative capacitor 170 ($C_p$ is a value of the parasitic capacitance, $C_r$ is a value of the reference capacitor). The effect of the driving impedance 175 is small enough to be neglected. After Step 505, the first output electric potential can be represented by $$V_1 = V_{m1} \cdot G_f + N = G_f \cdot \left\{ V_{bias} + \Delta V_{d1} \cdot \left( \frac{C_f}{C_f + C_r + C_p} \right) \right\} + N.$$

Here, N is the fixed pattern noise caused by the voltage follower circuit and impedance mismatch of circuit elements, and $G_f$ is the gain factor of the voltage follower, usually less than 1. After Step S10, the potential of the metal plate should be $$V_{m2} = V_{bias} + \Delta V_{d2} \cdot \left( \frac{C_f}{C_f + C_r + C_p} \right) = 1.5 + 3 \cdot \left( \frac{C_r}{C_f + C_r + C_p} \right).$$

Here, $\Delta V_{d2}$ is the potential change caused by a positive waveform (a voltage raise signal) sent by the driving source 160. In the present embodiment $\Delta V_{d1}=-\Delta V_{d2}=\Delta V_d$. After Step S11, the second output electric potential can be represented by $$V_2 = V_{m2} \cdot G_f + N = G_f \cdot \left\{ V_{bias} + \Delta V_{d2} \cdot \left( \frac{C_f}{C_f + C_r + C_p} \right) \right\} + N.$$

The positive and negative waveforms are symmetric in shape, and are step functions in the present embodiment. At the final step S13, the output of the differential amplifier 310 can be represented by $$V_{final} = g \cdot (V_1 - V_2) =$$

$$g \cdot G_f \cdot \left\{ +2\Delta V_d \cdot \left( \frac{C_r}{C_f + C_r + C_p} \right) \right\} = g \cdot G_f \cdot (-6) \left( \frac{C_r}{C_f + C_r + C_p} \right).$$

Here, g is the gain factor of the differential amplifier. The fixed pattern noise term (N) is cancelled in this method.

Figure 7:
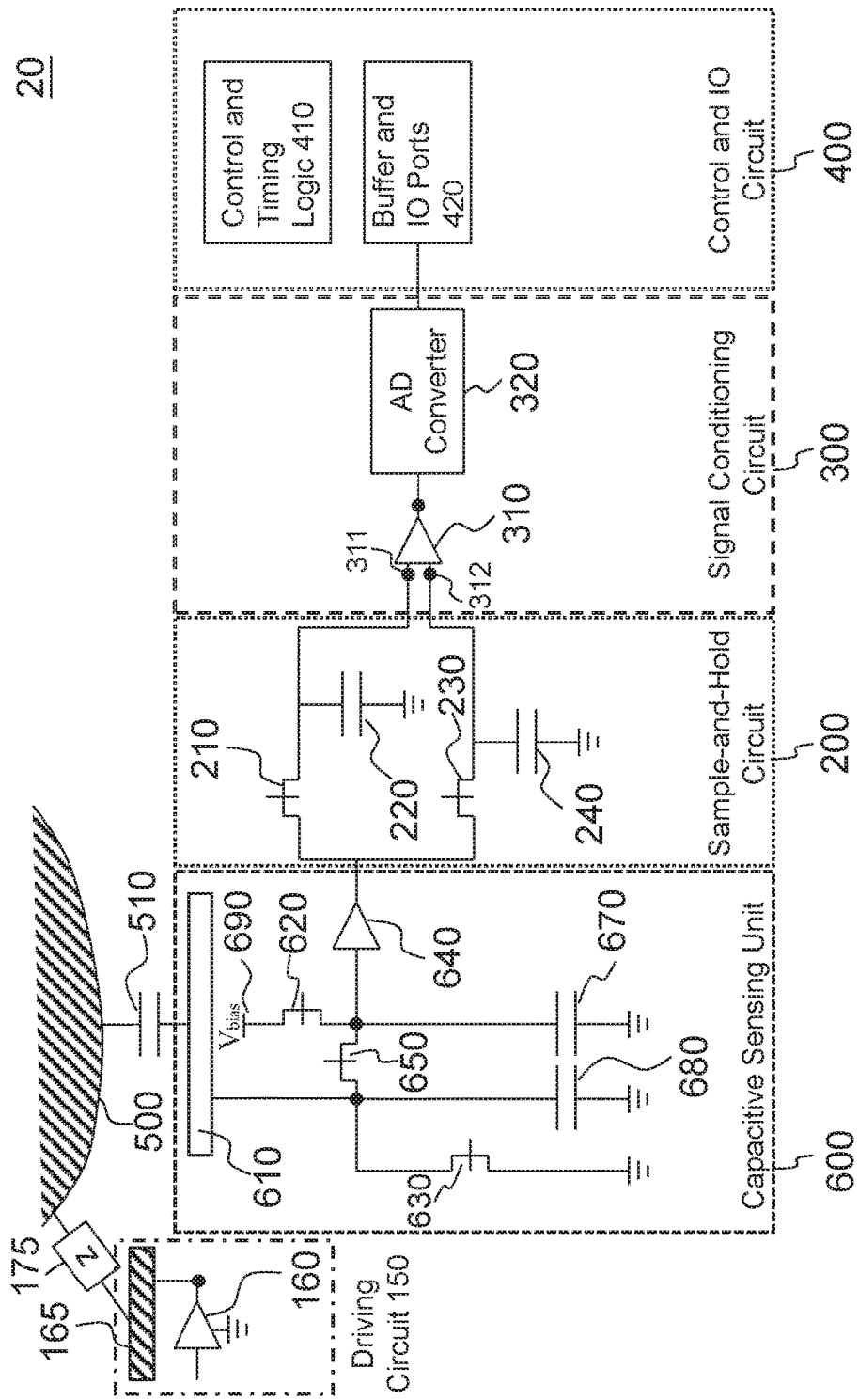
FIG. 7 is an equivalent circuit of the capacitive image sensor (one pixel) of a second embodiment according to the present invention.

Please refer to FIG. 7, FIG. 7 is an equivalent circuit of another embodiment of the capacitive fingerprint sensor 20 (one pixel). The only difference from the previous embodiment is the capacitive sensing unit 600. In the present embodiment, the capacitive sensing unit 600 comprises a sensing electrode 610, a first switch 620, a second switch 630, a share switch 650, a voltage follower 640, a first comparative capacitor 670, a second comparative capacitor 680, and a bias voltage source 690. A parasitic capacitance representing the sum of parasitic capacitance between the input node of the voltage follower 640 and other parts of the sensing structure that are not connected to it (not shown) can be treated as a part of the first comparative capacitor 670. The value of the parasitic capacitance, denoted as $C_{p1}$, may include the parasitic input capacitance of the voltage follower 640, the drain-to-body capacitance of the first switch 620 and the share switch 650, or the stray capacitance of any device with one node connected to the voltage follower 640. Another parasitic capacitance representing the sum of parasitic capacitance between the sensing electrode 610 and other parts of the sensing structure that are not connected to it (not shown) can be treated as a part of the second comparative capacitor 680. The value of the parasitic capacitance, denoted as $C_{p2}$, may include the drain-to-body capacitance of the second switch 630 and the share switch 650, or the stray capacitance of any device with one node connected to the sensing electrode 610. A reference capacitor (not shown), having a capacitance $C_{r1}$, is formed between ground and the voltage follower 640 to store the electric charges during the operation. Another reference capacitor (not shown), having a capacitance $C_{r2}$, is formed between ground and the sensing electrode 610, to store the electric charges during the operation. The detail of the operation will be described in the later paragraphs. The first and second comparative capacitors (670 and 680) are equivalent capacitors, denoted as $C_{c1}$ and $C_{c2}$, representing the total effect of the parasitic capacitances and the reference capacitors respectively, i.e. $C_{c1}=C_{r1}+C_{p1}$ and $C_{c2}=C_{r2}+C_{p2}$. There may be a lack of the reference capacitor for the same reason described in the previous embodiment. When a finger 500 approaches to the capacitive sensing unit 600, a finger capacitance 510, denoted as $C_f$, is formed therein between. The sensing electrode 610 is a metal plate at the top side of the capacitive sensing unit 100, used to form one side of a parallel plate capacitor. Here, the parallel plate capacitor is an equivalent capacitor representing the finger capacitance 510. The other side of the parallel plate capacitor is the surface of the finger 500, which is part of the human body. The driving electrode 165 carries the driving signals and couples that signal into the finger 500. The first switch 620 is a MOS device and one end thereof is connected to the input node of the voltage follower 640 and one end of the first comparative capacitor 670, and used to charge or discharge the first comparative capacitor 670. The other end of the first switch 620 is connected to the bias voltage source 690, while the other end of the first comparative capacitor 670 is connected to ground. The second switch 630 is also a MOS device. One end thereof is connected to the sensing electrode 610 and one end of the second comparative capacitor 680, and used to charge or discharge the sensing electrode 610 and the second comparative capacitor 680. The other end of the second switch 630 is connected to ground, and the other end of the second comparative capacitor 680 is also connected to ground. The share switch 650 is formed between the first comparative capacitor 670 and the second comparative capacitor 680, and used to share the charges among the finger capacitance 510, the first comparative capacitor 670, and the second comparative capacitor 680. The bias voltage is 2V constant voltage reference in the present embodiment. The voltage follower 640 is a circuit device that has input and output signals. The output signal tracks the input signal. Usually, a voltage follower is implemented as a unity gain amplifier. The input node of the voltage follower 640 is connected to the first comparative capacitor 670, and the output node is connected to the sample-and-hold circuit 200.

Figure 8:
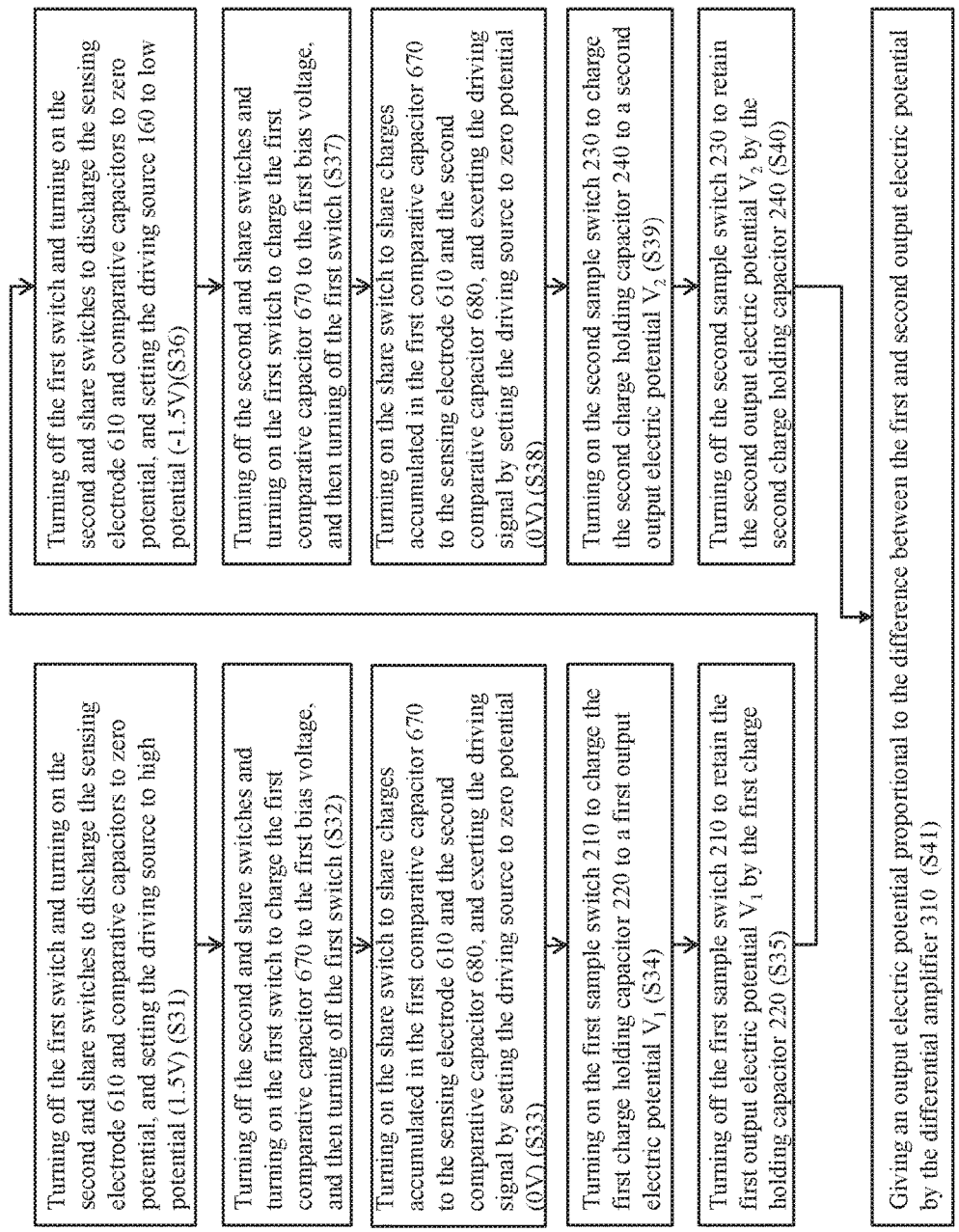
FIG. 8 is a flowchart illustrating a procedure to operate a capacitive sensing unit in the capacitive image sensor of the second embodiment.

A method for operating the capacitive image sensor 20 is also disclosed. Please refer to FIG. 8. It is a flowchart illustrating a procedure to operate a capacitive sensing unit 600 in the capacitive image sensor 20. The steps are:

(S31) turning off the first switch and turning on the second and share switches to discharge the sensing electrode 610 and comparative capacitors to zero potential, and setting the driving source 160 to high potential (1.5V);

(S32) turning off the second and share switches and turning on the first switch to charge the first comparative capacitor 670 to the bias voltage, and then turning off the first switch;

(S33) turning on the share switch to share charges accumulated in the first comparative capacitor 670 to the sensing electrode 610 and the second comparative capacitor 680, and exerting the driving signal by setting the driving source to zero potential (0V);

(S34) turning on the first sample switch 210 to charge the first charge holding capacitor 220 to a first output electric potential $V_1$;

(S35) turning off the first sample switch 210 to retain the first output electric potential $V_1$ by the first charge holding capacitor 220;

(S36) turning off the first switch and turning on the second and share switches to discharge the sensing electrode 610 and comparative capacitors to zero potential, and setting the driving source 160 to low potential (−1.5V);

(S37) turning off the second and share switches and turning on the first switch to charge the first comparative capacitor 670 to the bias voltage, and then turning off the first switch;

(S38) turning on the share switch to share charges accumulated in the first comparative capacitor 670 to the sensing electrode 610 and the second comparative capacitor 680, and exerting the driving signal by setting the driving source to zero potential (0V);

(S39) turning on the second sample switch 230 to charge the second charge holding capacitor 240 to a second output electric potential $V_2$, (S40) turning off the second sample switch 230 to retain the second output electric potential $V_2$ by the second charge holding capacitor 240; and (S41) giving an output electric potential proportional to the difference between the first and second output electric potential by the differential amplifier 310.

Here, the 1st and 2nd steps (S31-S32) are the first reset stage, the 3rd to 5th steps (S33-S35) are the first sensing stage, the 6th to 7th steps (S36-S07) are the second reset stage, the 8th to 10th steps (S38-S40) are the second sensing stage, and Step S41 is the final stage. Similarly, Sequence of steps S31-S35 and steps S36-S40 can be switched. The output electric potential in Step 41 is a noise-reduced value of that pixel (capacitive sensing unit). There may be additional steps to convert the output electric potentials into a digitized image. The steps are:

(S42) sequentially collecting the noise-reduced values obtained under corresponding positive waveform and negative waveform for each pixel;

(S43) converting the noise-reduced values into digitized noise-reduced values; and (S44) mapping the digitized noise-reduced values to corresponding locations of capacitive sensing units.

For a better understanding, a result analysis is illustrated below. After Step S33, the potential of the metal plate should be $$V_{m1} = V_{bias} \cdot \left(\frac{C_{C2}}{C_{C1} + C_{c2} + C_f}\right) + \Delta V_{d1} \cdot \left(\frac{C_f}{C_{C1} + C_{C2} + C_f}\right) =$$

$$2 \cdot \left(\frac{C_{C2}}{C_{C1} + C_{C2} + C_f}\right) - 1.5 \cdot \left(\frac{C_f}{C_{C1} + C_{C2} + C_f}\right).$$

Here, $V_{bias}$ is the potential of the bias voltage source 690, $C_f$ is the value of the finger capacitance 510, $C_{c1}$ is the value of the first comparative capacitor 670, and $C_{c2}$ is the value of the second comparative capacitor 680. After Step S34, the first output electric potential can be represented by $$V_1 = V_{m1} \cdot G_f + N =$$

$$G_f \cdot \left\{V_{bias} \cdot \left(\frac{C_{C2}}{C_{C1} + C_{C2} + C_f}\right) + \Delta V_{d1} \cdot \left(\frac{C_f}{C_{C1} + C_{C2} + C_f}\right)\right\} + N.$$

Here, N is the fixed pattern noise caused by the voltage follower circuit and impedance mismatch of circuit elements, and $G_f$ is the gain factor of the voltage follower, usually less than 1. After Step S38, the potential of the metal plate should be $$V_{m2} = V_{bias} \cdot \left(\frac{C_{C2}}{C_{C1} + C_{C2} + C_f}\right) + \Delta V_{d2} \cdot \left(\frac{C_f}{C_{C1} + C_{C2} + C_f}\right) =$$

$$2 + 1.5 \cdot \left(\frac{C_f}{C_{C1} + C_{C2} + C_f}\right).$$

After Step S39, the second output electric potential can be represented by $$V_2 = V_{m2} \cdot G_f + N =$$

$$G_f \cdot \left\{V_{bias} \cdot \left(\frac{C_{C2}}{C_{C1} + C_{C2} + C_f}\right) + \Delta V_{d2} \cdot \left(\frac{C_f}{C_{C1} + C_{C2} + C_f}\right)\right\} + N.$$

At the final step S41, the output of the differential amplifier 310 can be represented by $$V_{final} = g \cdot (V_1 - V_2) =$$

$$g \cdot G_f \cdot \left\{+2\Delta V_d \cdot \left(\frac{C_f}{C_{C1} + C_{C2} + C_f}\right)\right\} = g \cdot G_f \cdot (-3)\left(\frac{C_f}{C_{C1} + C_{C2} + C_f}\right).$$

Here, g is the gain factor of the differential amplifier. The fixed pattern noise term (N) is cancelled in this method.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A capacitive image sensor, comprising:
    a plurality of capacitive sensing units forming an array, each capacitive sensing unit for transforming a distance between a portion of a surface of an approaching finger and a top surface thereof into an output electric potential, wherein a value of the output electric potential is changed by a driving signal coupled on the finger;
    at least one sample-and-hold circuit for capturing and retaining different output electric potentials;
    at least one signal conditioning circuit, each comprising at least one differential amplifier for amplifying a difference between two electric potentials retained by the sample-and-hold circuit; and
    a driving source, for providing the driving signal to the finger,
    wherein the driving signal is a signal with a potential change or potential changes, caused by a positive waveform or a negative waveform; the electric potential at each part of the capacitive sensing units is set to a constant value during reset stages; the difference between two output electric potentials retained in the sample-and-hold circuit is a noise-reduced value representing a distance between the capacitive sensing unit and the portion surface of the finger above the capacitive sensing unit; the sample-and-hold circuit retains at least a first and a second output electric potentials under a corresponding positive waveform or negative waveform; the capacitive image sensor sequentially collects the noise-reduced values under the corresponding positive waveform and negative waveform for each pixel, and maps the noise-reduced values to corresponding locations of the capacitive sensing units to obtain a noise-reduced image of the finger;
    wherein the capacitive sensing unit further comprises: a sensing electrode; a voltage follower, wherein an input node of the voltage follower is connected to the sensing electrode, and an output node of the voltage follower is connected to the sample-and-hold circuit; a first comparative capacitor, wherein one node of the first comparative capacitor is electrically connected to the voltage follower, and the other node thereof is electrically connected to a ground end; a bias voltage source, for providing a constant bias voltage; and a first switch, connected between the bias voltage source and the first comparative capacitor; and wherein the first comparative capacitor and all components electrically connected thereto is reset to the constant bias voltage while the first switch is turned on.

2. The capacitive image sensor according to claim 1, wherein shapes of the positive waveform and the negative waveform are symmetrical.

3. The capacitive image sensor according to claim 1, wherein the positive waveform or the negative waveform is a step function.

4. The capacitive image sensor according to claim 1, wherein the at least one signal conditioning circuit further comprises an analog-to-digital converter for converting the output electric potentials from the differential amplifier into a digitized value.

5. The capacitive image sensor according to claim 1, wherein the first comparative capacitor comprises a reference capacitor and parasitic capacitance.

6. The capacitive image sensor according to claim 5, wherein the reference capacitor is a MOSFET (Metal-Oxide-Semiconductor Field-Effect Transistor) capacitor, a PIP (Polysilicon-Insulator-Polysilicon) capacitor or a MIM (Metal-Insulator-Metal) capacitor.

7. The capacitive image sensor according to claim 1, wherein the capacitive sensing unit further comprises:
a second comparative capacitor, connected between the sensing electrode and the ground;
a share switch, connected between the first and second comparative capacitors; and
a second switch, connected between the sensing electrode and ground,
wherein the sensing electrode is reset to ground potential when the second switch is turned on.

8. The capacitive image sensor according to claim 1, wherein each sample-and-hold circuit further comprises:

a first and a second charge holding capacitors, for holding the output electric potentials sent by the voltage follower; and
at least one selecting switch, for switching between the charge holding capacitors.

9. A method for operating the capacitive image sensor according to claim 1 to fetch an image of a finger, comprising the steps of:
resetting capacitive sensing units to be capable of sensing;
exerting a driving signal having a first waveform to the capacitive sensing units via a finger;
retaining a first output electrical potential;
resetting the capacitive sensing units to be capable of sensing;
exerting the driving signal having a second waveform to the capacitive sensing units via the finger;
retaining a second output electrical potential;
giving an output electric potential proportional to the difference between the first and second output electric potential;
sequentially collecting the noise-reduced values obtained under corresponding positive waveform and negative waveform for each pixel;
converting the noise-reduced values into digitized noise-reduced values; and
mapping the digitized noise-reduced values to corresponding locations of capacitive sensing units.

10. The method according to claim 9, wherein if the first waveform is a positive waveform, then the second waveform is a negative waveform; if the first waveform is a negative waveform, then the second waveform is a positive waveform.

* * * * *